(12) United States Patent
Chen

(10) Patent No.: US 9,912,179 B2
(45) Date of Patent: Mar. 6, 2018

(54) CHARGING STATION WITH SUCTION BASE

(71) Applicant: Lung-Chih Chen, Taichung (TW)

(72) Inventor: Lung-Chih Chen, Taichung (TW)

(73) Assignee: Ferro-Carbon Ent. Co. Ltd., Taichung (TW)

( * ) Notice: Subject to any disclaimer, the term of this patent is extended or adjusted under 35 U.S.C. 154(b) by 71 days.

(21) Appl. No.: 15/157,254

(22) Filed: May 17, 2016

(65) Prior Publication Data

US 2017/0338675 A1    Nov. 23, 2017

(51) Int. Cl.
*H02J 7/00* (2006.01)

(52) U.S. Cl.
CPC .......... *H02J 7/0044* (2013.01); *H02J 7/0027* (2013.01)

(58) Field of Classification Search
CPC ..................................................... H02J 7/0044
USPC ................................................. 320/114–115
See application file for complete search history.

(56) References Cited

U.S. PATENT DOCUMENTS

| 2011/0148352 A1* | 6/2011 | Wang | B60R 11/0241 |
| | | | 320/108 |
| 2016/0204634 A1* | 7/2016 | Parlow | H02J 7/0044 |
| | | | 320/114 |

* cited by examiner

*Primary Examiner* — David V Henze-Gongola
(74) *Attorney, Agent, or Firm* — Che-Yang Chen; Law Offices of Scott Warmuth

(57) ABSTRACT

A charging station with a suction base may comprise a suction cup apparatus and a base portion, and the suction cup apparatus has a shell which further comprises a U-shaped slot formed at a lateral portion thereof. The U-shaped slot comprises two side walls, an inner wall and a bottom wall to receive the base portion through an engaging portion of the base portion. The base portion further has a placing portion which comprises a first blocking portion and a second blocking portion to provide a firm placing space for a 3C product both when charging and not charging.

5 Claims, 8 Drawing Sheets

CHARGING STATION WITH SUCTION BASE

FIELD OF THE INVENTION

The present invention relates to a charging station, and more particularly to a charging station with a suction base.

BACKGROUND OF THE INVENTION

Generally, a 3C product is charged by connecting a power adapter through a power cord, and, when charging, the 3C product is always put on nearby table, couch or ground, or is directly suspended in the air. Also, when a user cannot find a place to put his 3C product, he may take a risk to put it on the power adapter which is easy to fall the 3C product down to the ground. Moreover, in above case, the power cord of the 3C product is prone to be pulled thereby again falling the 3C product down to the ground. As a result, it is inconvenient for charging and increases the possibility of damaging the 3C product. Furthermore, a lot of users do not like to pull the power adapter out of a socket after using because they cannot find a place to store it thus presenting adverse visual impact and wasting electricity. On the other hand, in case that the user wants to use the 3C product when charging, the 3C product has to be supported by other objects to keep the 3C product vertical or be skewed with an angle which is unstable and is inconvenient in adjusting the inclined angle of the 3C product. Also, it is almost impossible to lean the 3C product on a wall and use it simultaneously when charging. Therefore, there remains a need for a new and improved design for a suction cup apparatus with a base for power adapter to overcome the problems presented above.

SUMMARY OF THE INVENTION

The present invention provides a charging station with a suction base which comprises a suction cup apparatus and a base portion. The suction cup apparatus has a shell, a suction cup, a spring and a handle, and a first through hole vertically penetrates through the shell. A rod is extended from a central portion of a rear surface of the suction cup and passes through the spring into the first through hole, and the handle is coupled with a top end of the rod. By pulling the handle to allow the suction cup to create a partial vacuum, the suction cup apparatus can adhere to a surface such as a wall. Also, a lateral portion of the shell has a U-shaped slot which comprises two side walls, an inner wall and a bottom wall. The two side walls and the inner wall respectively connected to three edges of the bottom wall are perpendicular to the bottom wall, and the two side walls are parallel while the inner wall faces to the base portion to form a U-shape. Furthermore, each of the two side walls has at least a guiding slot formed at corresponding positions. The bottom wall is elastic and has a board body, and a locating hole is formed on a surface of the board body. The base portion integrally comprises an engaging portion and a placing portion, and the engaging portion has a connecting portion which is formed in a square tube shape. Each of two lateral walls of the engaging portion respectively has at least a first protruding piece, and the number and the positions of the first protruding pieces are corresponded to the guiding slots. Moreover, a bottom wall of the engaging portion has a second protruding piece which is configured to engage with the locating hole of the board body. The base portion is connected to the suction cup apparatus by respectively connecting the first protruding pieces with the guiding slots and engaging the second protruding piece with the locating hole thereby securing the engaging portion of the base portion into the shell. The placing portion has a first blocking portion which is parallel with the suction cup, and a second blocking portion which is perpendicular to the first blocking portion to form a placing space for a 3C product.

In one embodiment, an upper portion of the rod has a second through hole while the handle has a third through hole which is located a position corresponding to the second through hole such that a bolt can penetrate through the second through hole and the third through hole to engage the rod with the handle.

In another embodiment, the inner wall comprises a plurality of first grooves which are configured to receive at least a conductive prong of a plug.

In still another embodiment, the first blocking portion and the second blocking portion respectively have a first blocking piece and a second blocking piece which respectively protrude from a surface of the first blocking portion and a surface of the second blocking portion and are configured to provide supporting surfaces for the 3C product.

In a further embodiment, the base portion has a cable groove which is formed between the first blocking portion and the second blocking portion and is configured to provide a space for coiling a power cord. Furthermore, an opening edge of the cable groove further has a plurality of locating pieces to position the power cord settled inside the cable groove.

Comparing with conventional charging stations, the present invention is advantageous because: the shell of the suction cup apparatus comprises the two side walls, the inner wall and the bottom wall such that the base portion can directly and quickly connect to the suction cup apparatus by respectively connecting the first protruding pieces and the second protruding piece to the guiding slots and the locating hole. Moreover, the connecting portion of the base portion is configured to receive and secure the plug, and through the first blocking portion and the second blocking portion, the 3C product can be firmly placed on the base portion for use thereby improving the practicability of the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
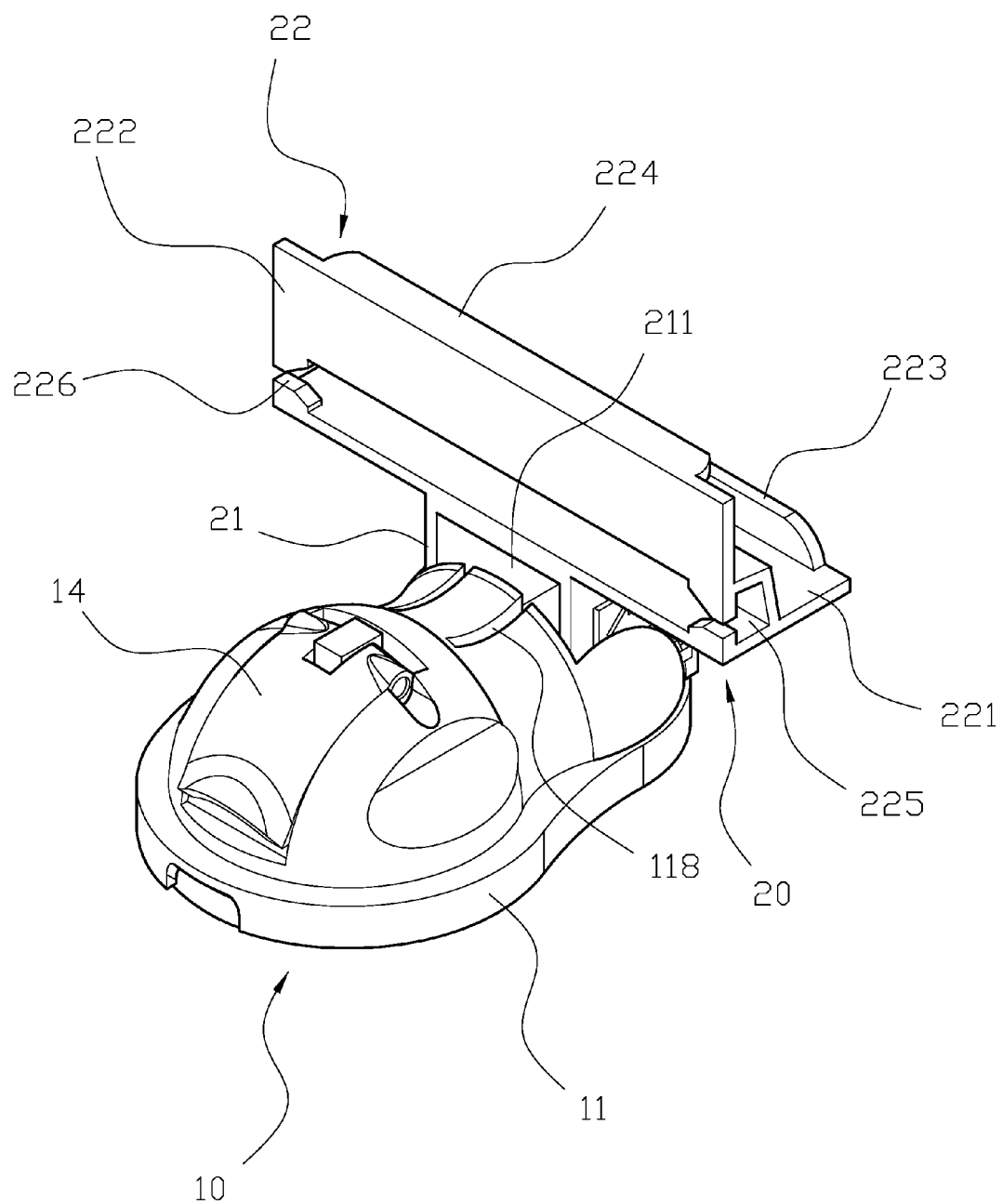
FIG. 1 is a three-dimensional view of a charging station with a suction base in the present invention.
Figure 2:
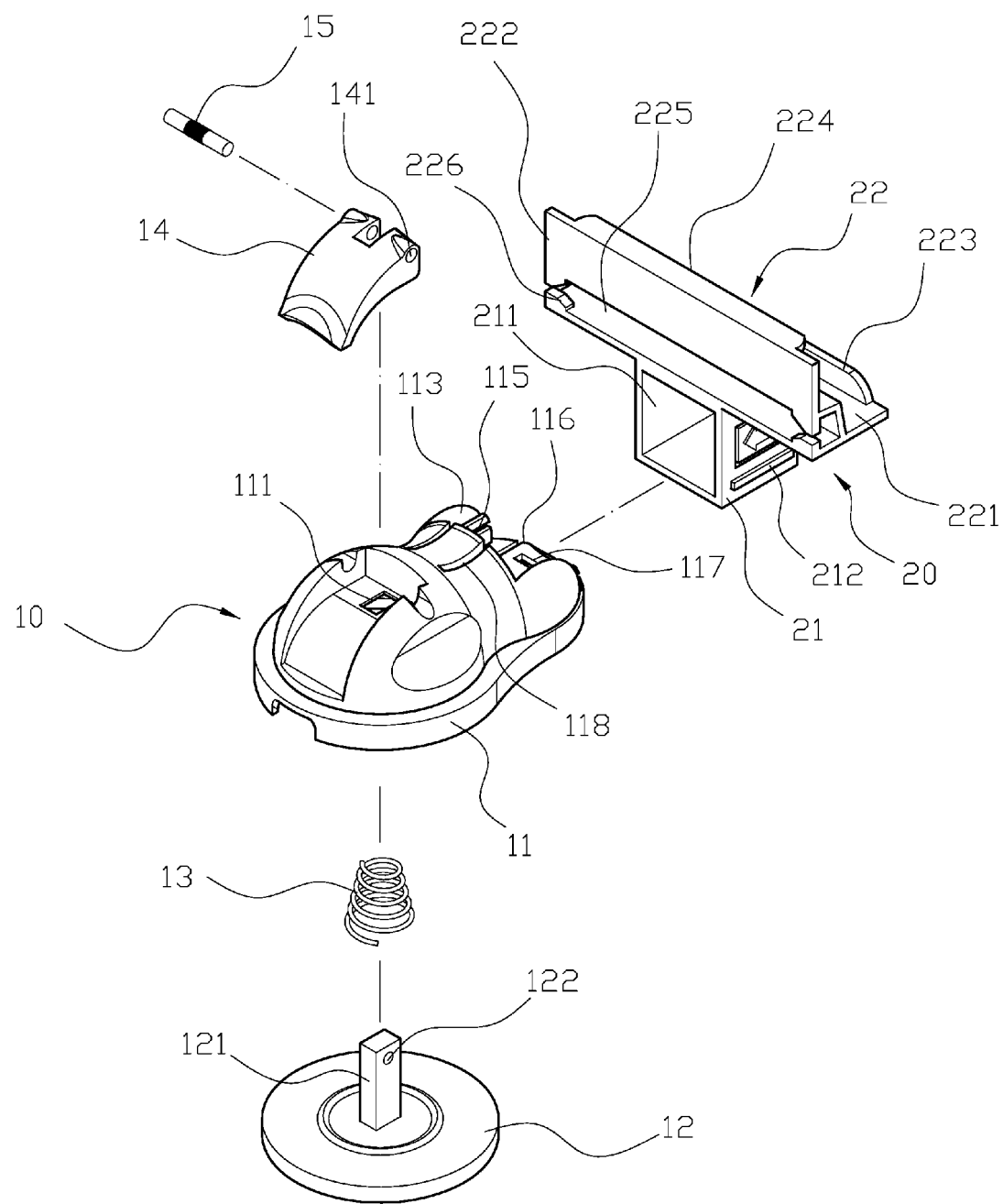
FIG. 2 is a three-dimensional exploded view of the charging station with a suction base in the present invention.

In order to further understand the goal, characteristics and effect of the present invention, a number of embodiments along with the drawings are illustrated as following:

Referring to FIGS. 1 and 2, the present invention provides a charging station with a suction base, which comprises a suction cup apparatus (10) and a base portion (20). The suction cup apparatus (10) has a shell (11), a suction cup (12), a spring (13) and a handle (14), and a first through hole (111) vertically penetrates through the shell (11). A rod (121) is extended from a central portion of a rear surface of the suction cup (12) and passes through the spring (13) into the first through hole (111), and the handle (14) is coupled with a top end of the rod (121). An upper portion of the rod (121) has a second through hole (122) while the handle (14) has a third through hole (141) which is located a position corresponding to the second through hole (122) such that a bolt (15) can penetrate through the second through hole (122) and the third through hole (141) to engage the rod (121) with the handle (14). As a result, by pulling the handle (14) to allow the suction cup (12) to create a partial vacuum, the suction cup apparatus (10) can adhere to a surface such as a wall. Also, a lateral portion of the shell (11) has a U-shaped slot which comprises two side walls (112), an inner wall (113) and a bottom wall (114). The two side walls (112) and the inner wall (113) respectively connected to three edges of the bottom wall (114) are perpendicular to the bottom wall (114), and the two side walls (112) are parallel while the inner wall (113) faces to the base portion (20) to form a U-shape. Furthermore, each of the two side walls (112) has at least a guiding slot (115) formed at corresponding positions. The bottom wall (114) is elastic and has a board body (116), and a locating hole (117) is formed on a surface of the board body (116). The base portion (20) integrally comprises an engaging portion (21) and a placing portion (22), and the engaging portion (21) has a connecting portion (211) which is formed in a square tube shape. Each of two lateral walls of the engaging portion (21) respectively has at least a first protruding piece (212), and the number and the positions of the first protruding pieces (212) are corresponded to the guiding slots (115). Moreover, a bottom wall of the engaging portion (21) has a second protruding piece (213) which is configured to engage with the locating hole (117) of the board body (116). The base portion (20) is connected to the suction cup apparatus (10) by respectively connecting the first protruding pieces (212) with the guiding slots (115) and engaging the second protruding piece (213) with the locating hole (117) thereby securing the engaging portion (21) of the base portion (20) into the shell (11). Also, the inner wall (113) comprises a plurality of first grooves (118) which are configured to receive at least a conductive prong of a plug (a). The placing portion (22) has a first blocking portion (221) which is parallel with the suction cup (12), and a second blocking portion (222) which is perpendicular to the first blocking portion (221) to form a placing space for a 3C product (b). In addition, the first blocking portion (221) and the second blocking portion (222) respectively have a first blocking piece (223) and a second blocking piece (224) which respectively protrude from a surface of the first blocking portion (221) and a surface of the second blocking portion (222) and are configured to provide supporting surfaces for the 3C product (b). Moreover, the base portion (20) has a cable groove (225) which is formed between the first blocking portion (221) and the second blocking portion (222) and is configured to provide a space for coiling a power cord (a1). Furthermore, an opening edge of the cable groove (225) has at least two locating pieces (226) to position the power cord (a1) settled inside the cable groove (225). Thus, by combining the above structures with the suction cup apparatus (10) and the connecting portion (211) of the base portion (20), the present invention can provide a stable structure for a 3C product both when charging and not charging.

Figure 3:
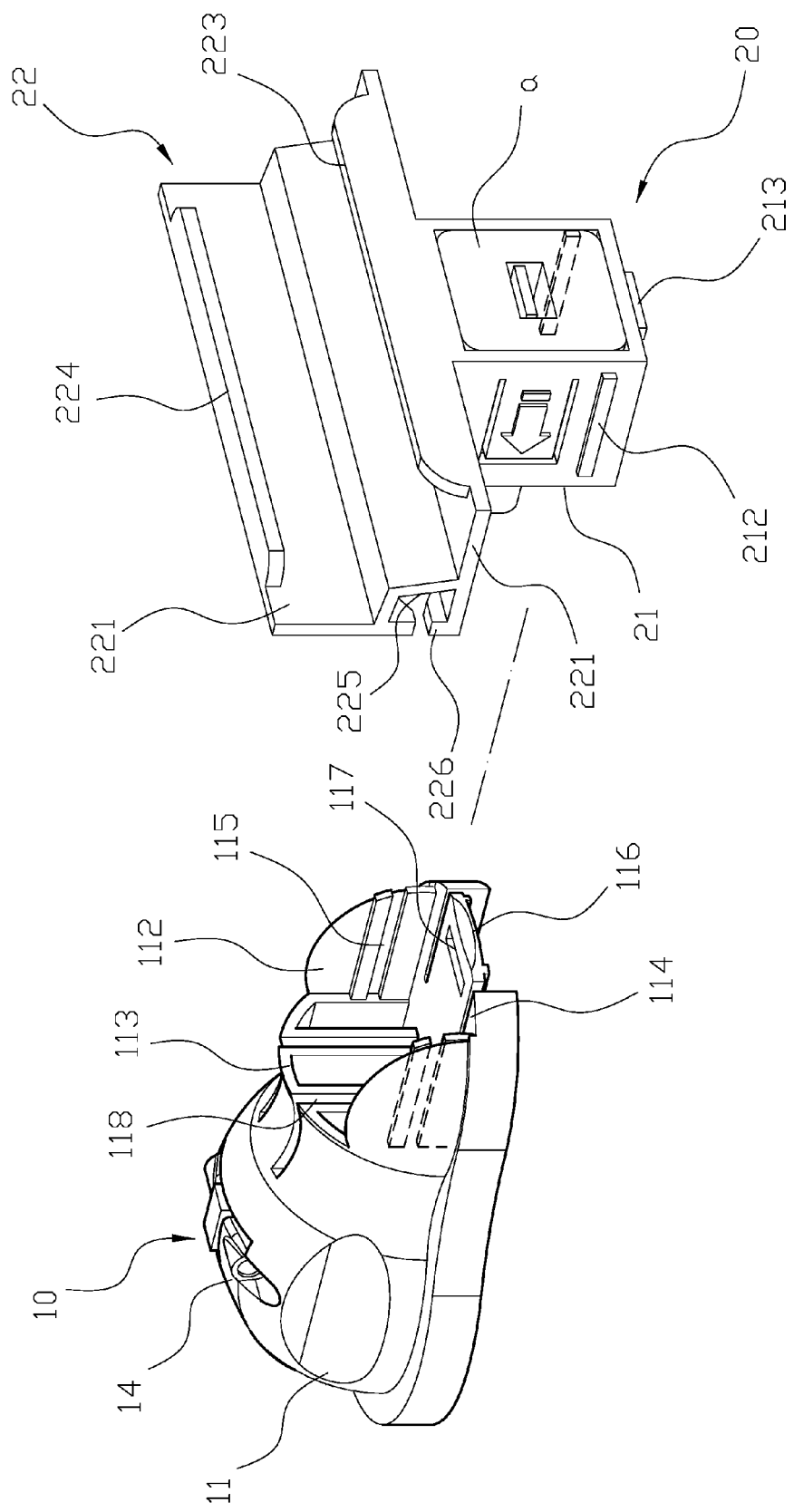
FIG. 3 is a schematic view illustrating the charging station with a suction base of the present invention when in use.
Figure 4:
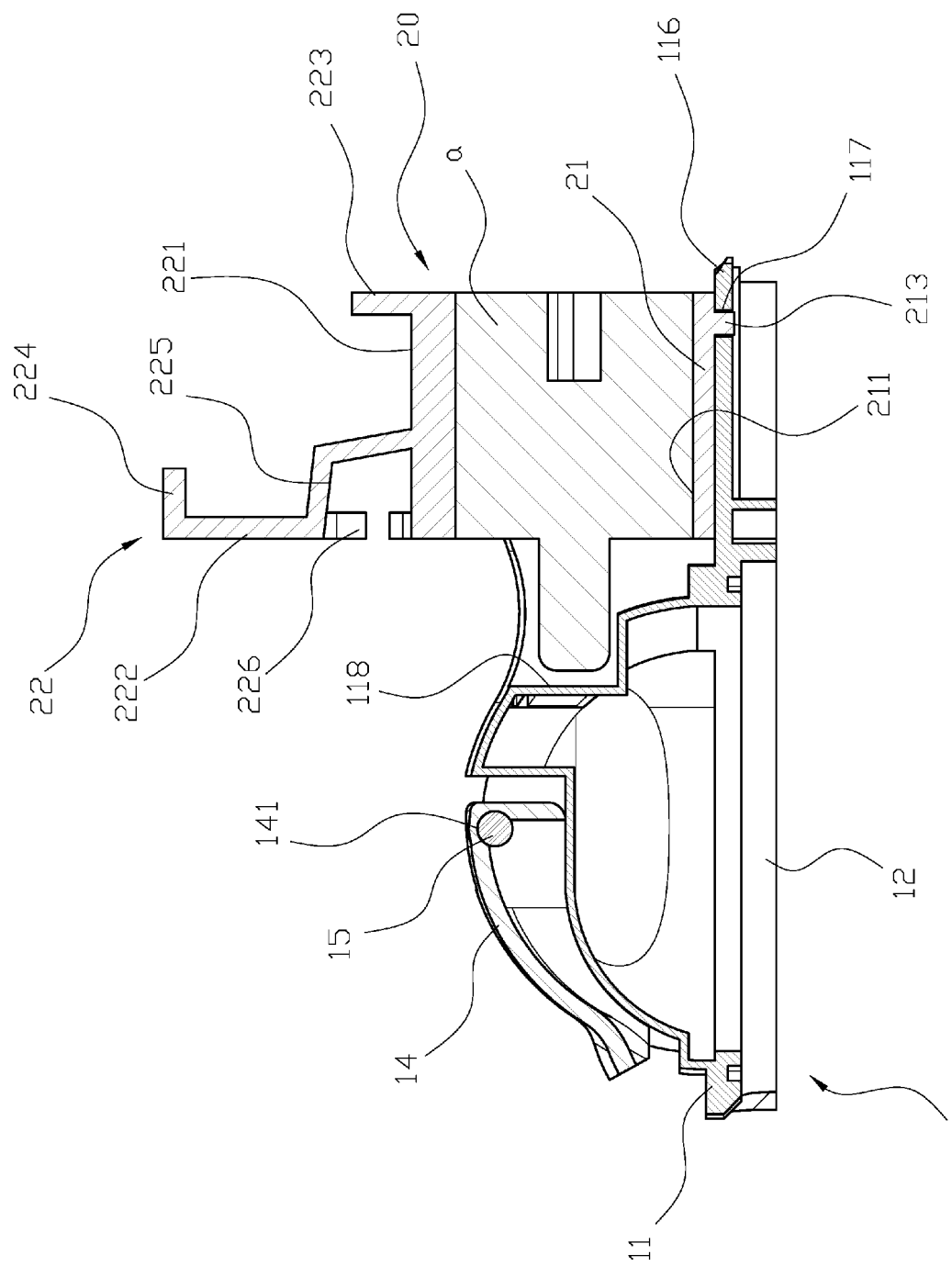
FIG. 4 is a second schematic view illustrating charging station with a suction base of the present invention when in use.
Figure 5:
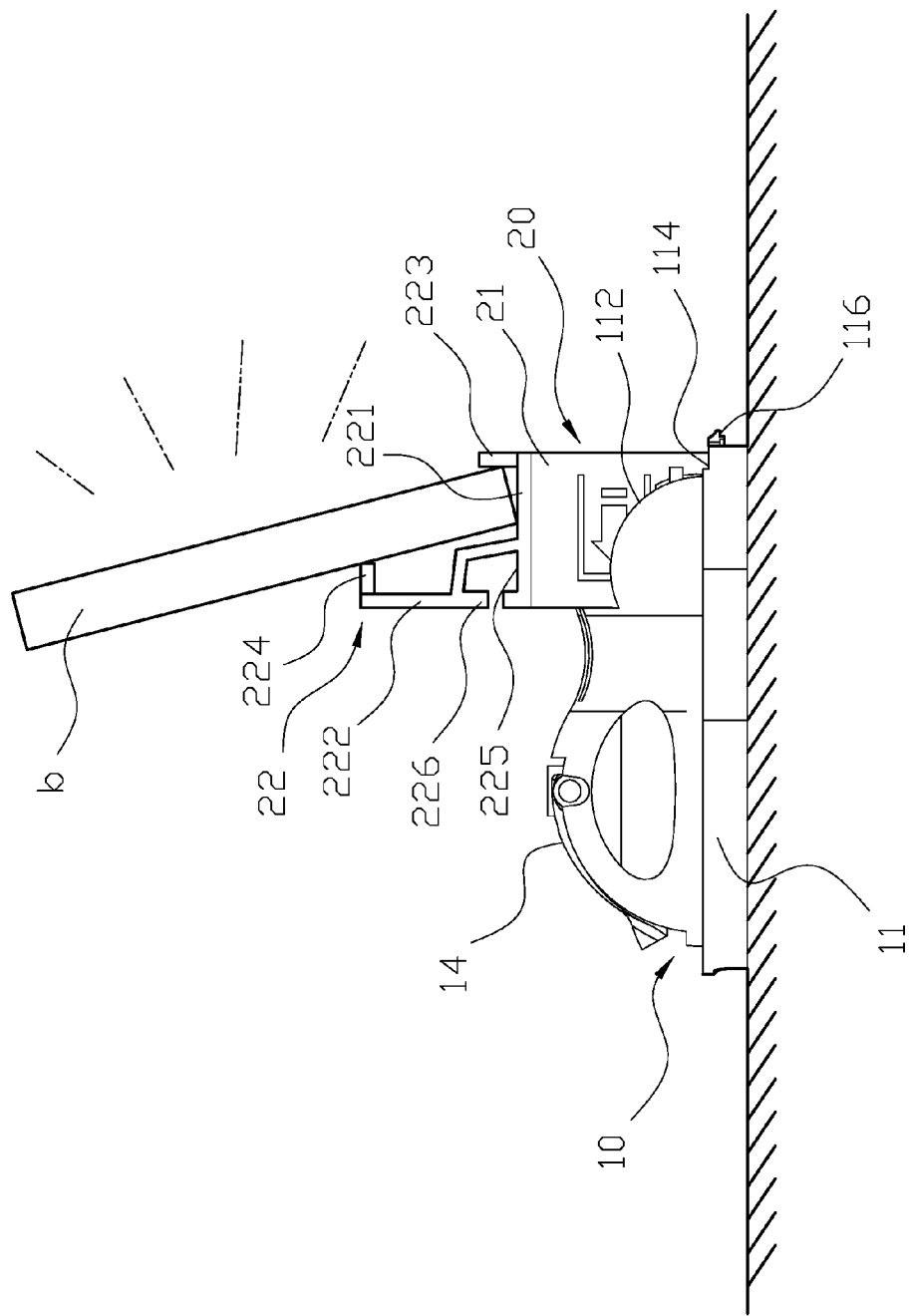
FIG. 5 is a third schematic view illustrating the charging station with a suction base of the present invention when in use.
Figure 6:
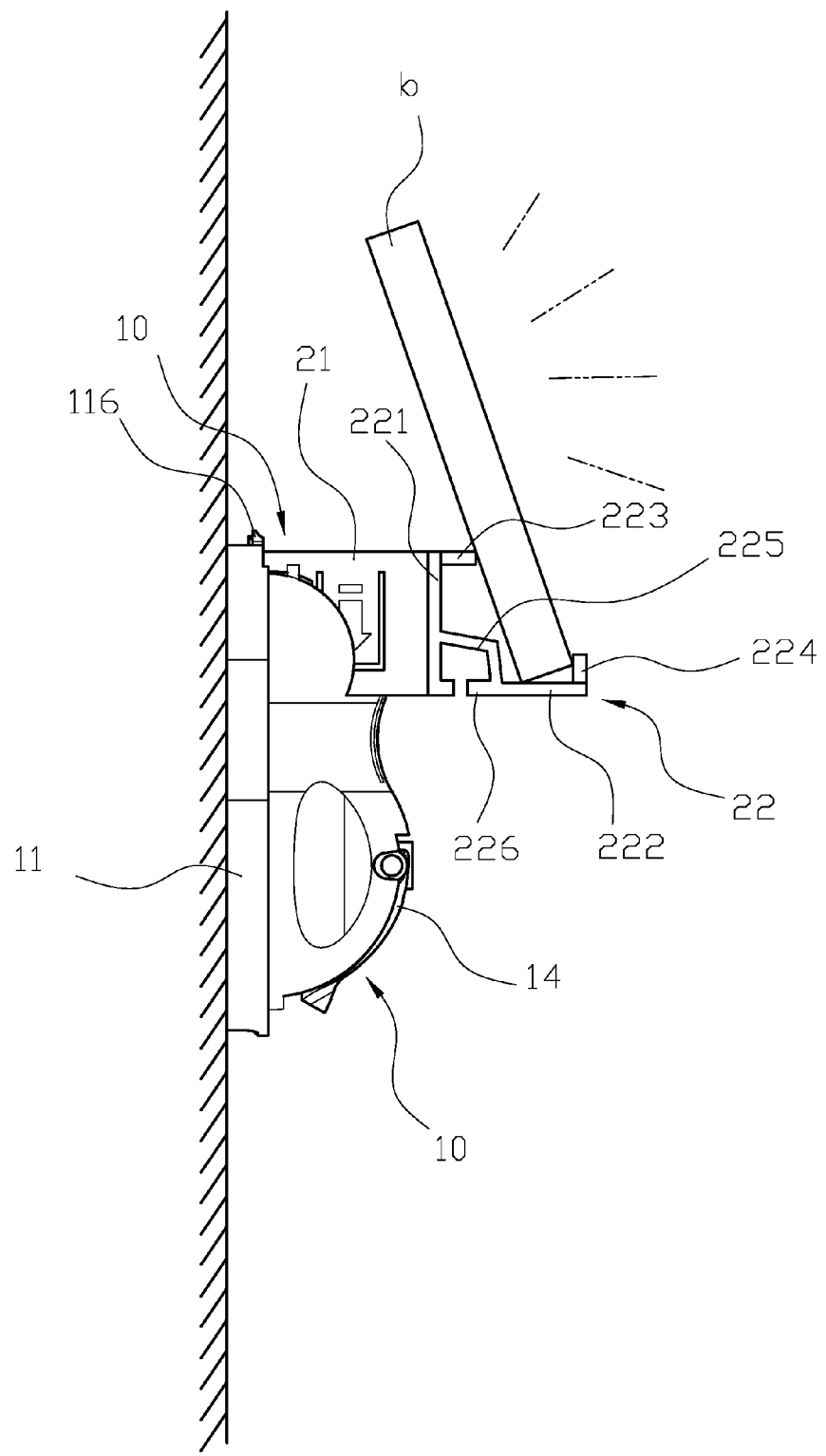
FIG. 6 is a fourth schematic view illustrating the charging station with a suction base of the present invention when in use.
Figure 7:
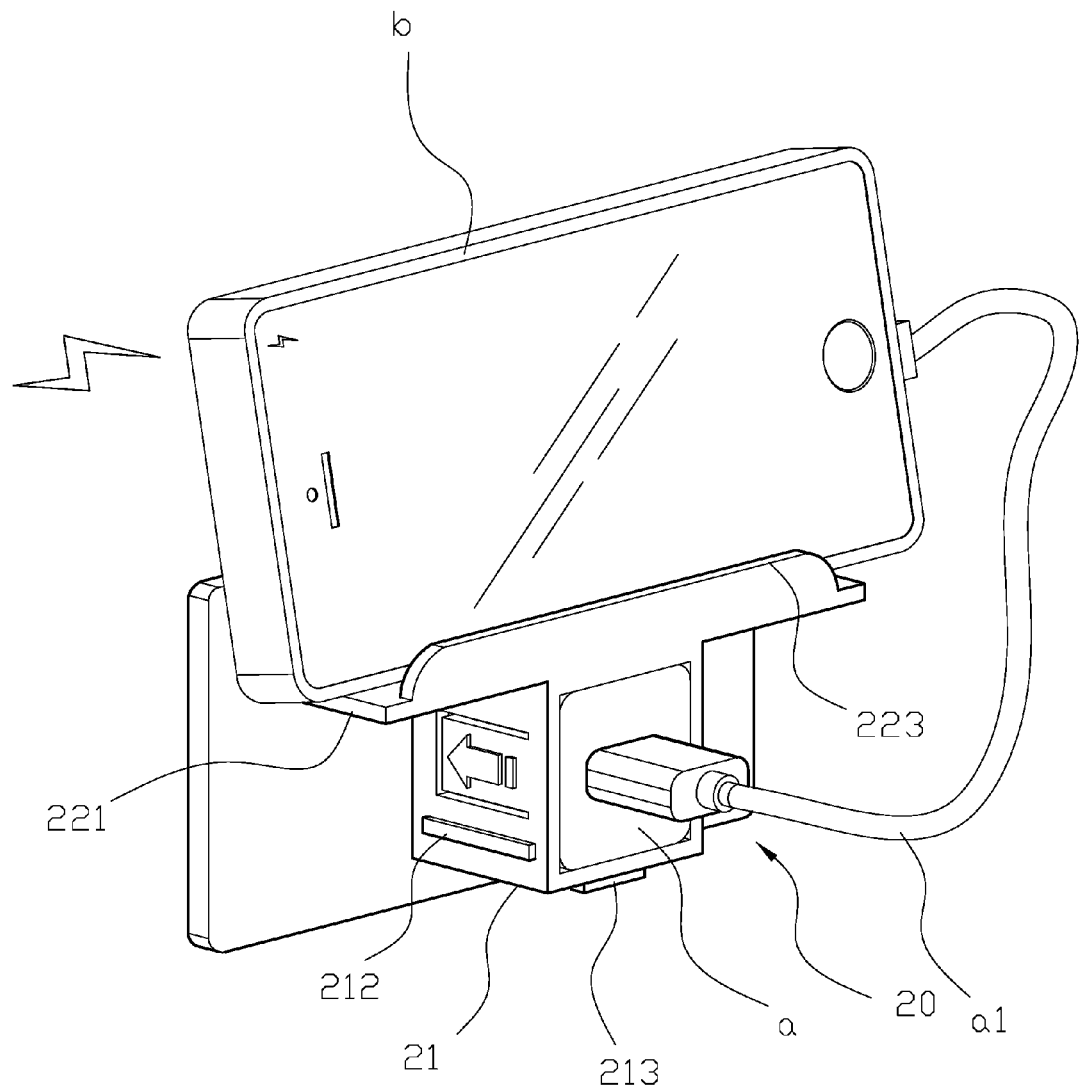
FIG. 7 is a fifth schematic view illustrating the charging station with a suction base of the present invention when in use.
Figure 8:
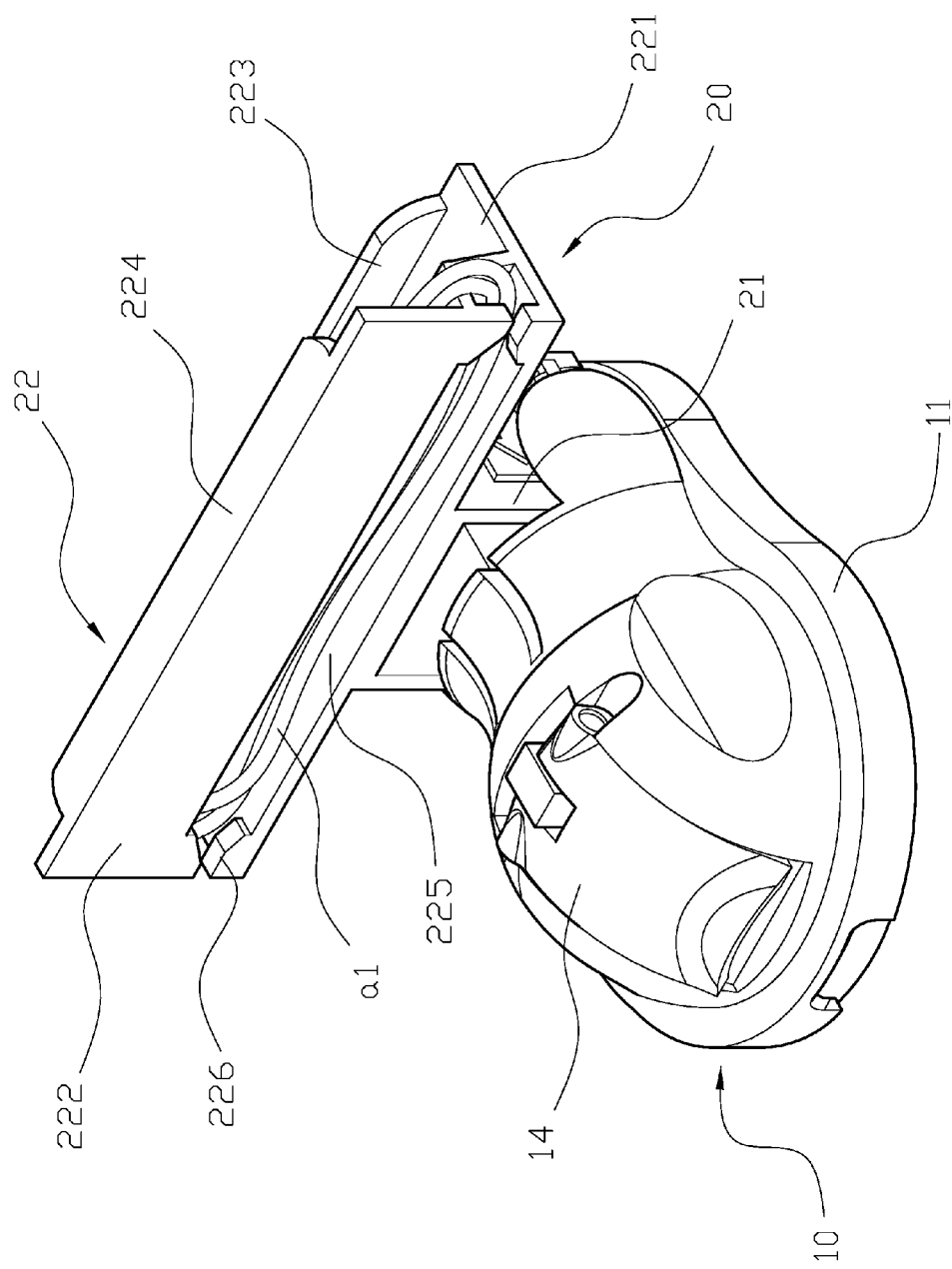
FIG. 8 is a sixth schematic view illustrating the charging station with a suction base of the present invention when in use.

In actual application, referring to FIGS. 2, 3 and 4, the suction cup apparatus (10) can adhere to a surface by pulling the handle (14) to allow the suction cup (12) to create a partial vacuum, and also can be detached from the surface when a user release the handle (14) by pressing the suction cup (12) back to its initiated position through the spring (13). Furthermore, the shell (11) of the suction cup apparatus (10) has the U-shaped slot formed by the two side walls (112), the inner wall (113) and the bottom wall (114) such that the base portion (20) can directly connect to the suction cup apparatus (10) through the engaging portion (21). When the base portion (20) connecting to the suction cup apparatus (10), the first protruding pieces (212) of the engaging portion (21) can respectively slide through the guiding slots (115) formed on the two side walls (112) and the base portion (20) can be quickly secured on the suction cup apparatus (10) by engaging the second protruding piece (213) with the locating hole (117) of the board body (116). Conversely, the base portion (20) can be disconnected to the suction cup apparatus (10) by pressing the board body (116) to disengage the second protruding piece (213) with the locating hole (117). The connecting portion (211) of the engaging portion (21) of the base portion (20) is configured to receive the plug (a), and U-shaped slot of the shell (11) has the inner wall (113) comprising the first grooves (118) which are configured to receive at least one conductive prong of a plug (a) such that the unused plug (a) can be secured on the suction cup apparatus (10). In actual application, the suction cup apparatus (10) can be adhered to the wall adjacent to a socket to achieve effects of convenient access and storage. Referring to FIGS. 5, 6 and 7, the placing portion (22) of the base portion (20) is configured to place the 3C product (b), and when the suction cup apparatus (10) adhered to a horizontal surface such as a desktop or a table, a bottom portion of the 3C product (b) is placed on the first blocking portion (221) of the base portion (20) such that the first blocking piece (223) of the first blocking portion (221) can provide a support for the 3C product (b). Also, the present invention allows an upper portion of the 3C product (b) to bear against the second blocking piece (224) of the second blocking portion (222) thus the 3C product (b) being stably tilted and secured on the placing portion (22). Additionally, combining with the suction cup apparatus (10) which is adhered to the surface, the 3C product (b) can be firmed placed on the placing portion (22) of the present invention for use. On the other hand, when the suction cup apparatus (10) adhered to a vertical surface such as a wall, the bottom of the 3C product (b) is placed on the second blocking portion (222) of the base portion (20) such that the second blocking piece (224) can provide a support for the 3C product (b). Moreover, similarly, the present invention allows the upper portion of the 3C product (b) to bear against the first blocking piece (223) of the first blocking portion (221), and thus the 3C product (b) is stably tilted and secured on the placing portion (22) for use. In the same way, when charging the 3C product (b) through the plug (a), the 3C product (b) can be placed on the placing portion (22) of the base portion (20) thereby preventing the 3C product (b) from being suspended in the air. Referring to FIG. 8, the placing portion (22) of the base portion (20) has the cable groove (225), and the opening edge thereof further comprises at least the two locating pieces (226) which are configured to settle the power cord (a1) of the plug (a) inside the cable groove (225) thereby accomplishing the effect of placement of the 3C product (b) and settlement of the power cord (a1) of the plug (a).

Comparing with conventional suction cup apparatus, the present invention is advantageous because: the shell (11) of the suction cup apparatus (10) comprises the two side walls (112), the inner wall (113) and the bottom wall (114) such that the base portion (20) can directly and quickly connect to the suction cup apparatus (10) by respectively connecting the first protruding pieces (212) and the second protruding piece (213) to the guiding slots (115) and the locating hole (117). Moreover, the connecting portion (211) of the base portion (20) is configured to receive and secure the plug (a), and through the first blocking portion (221) and the second blocking portion (222), the 3C product (b) can be firmly placed on the base portion (20) for use thereby improving the practicability of the present invention.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A charging station with a suction base comprising a suction cup apparatus having a shell, a suction cup, a spring and a handle; a first through hole vertically penetrating through the shell, a rod extended from a central portion of a rear surface of the suction cup and passing through the spring into the first through hole, and the handle coupled with a top end of the rod, by pulling the handle to allow the suction cup to create a partial vacuum, the suction cap apparatus configured to adhere to a surface, a lateral portion of the shell having a U-shaped slot which comprises two side walls, an inner wall and a bottom wall, and the two side walls and the inner wall which are respectively connected to three edges of the bottom wall respectively being perpendicular to the bottom wall, and the two side walls being parallel with the inner wall facing to a base portion to form a U-shape, each of the two side walls having at least a guiding slot formed at corresponding positions, and the bottom wall being elastic and having a board body, and a locating hole formed on a surface of the board body; and the base portion comprising an engaging portion and a placing portion, and the engaging portion having a connecting portion which is formed in a square tube shape, each of two lateral walls of the engaging portion respectively having at least a first protruding piece, and the number and the positions of the at least one first protruding pieces being corresponded to the guiding slots on the two side walls, a bottom portion of the engaging portion having a second protruding piece which is configured to engage with the locating hole of the board body, the engaging portion of the base portion connected to the shell by respectively connecting the first protruding pieces with the guiding slots and engaging the second protruding piece with the locating hole thereby securing the base portion on the suction cup apparatus, the placing portion of the base portion having a first blocking portion which is parallel with the suction cup, and a second blocking portion which is perpendicular to the first blocking portion, to form a firm placing space for a mobile device when charging and not charging.

2. The charging station with a suction base of claim 1, wherein the rod has a second through hole while the handle has a third through hole which is located at a position corresponding to the second through hole, and a bolt is configured to penetrate through the second through hole and the third through hole to engage the rod with the handle.

3. The charging station with a suction base of claim 1, wherein an inner wall comprises a plurality of first grooves which are configured to receive at least a conductive prong of a plug secured inside the connecting portion of the base portion.

4. The charging station with a suction base of claim 1, wherein the first blocking portion and the second blocking portion respectively have a first blocking piece and a second blocking piece which respectively protrude from a surface of the first blocking portion and a surface of the second blocking portion and are configured to provide supporting surfaces for the mobile device.

5. The charging station with a suction base of claim 1, wherein the base portion has a cable groove which is formed between the first blocking portion and the second blocking portion and is configured to provide a space for coiling a power cord of a plug, and a plurality of locating pieces formed at an opening edge of the cable groove are configured to position the power cord settled inside the cable groove.

* * * * *